Oct. 29, 1935.          J. S. KEEN                2,018,790
REVERSING MECHANISM FOR POPPET VALVE GEAR CAM BOXES
            Filed Nov. 19, 1932         4 Sheets-Sheet 1

INVENTOR
John S. Keen
BY
Edward Hathaway
ATTORNEY

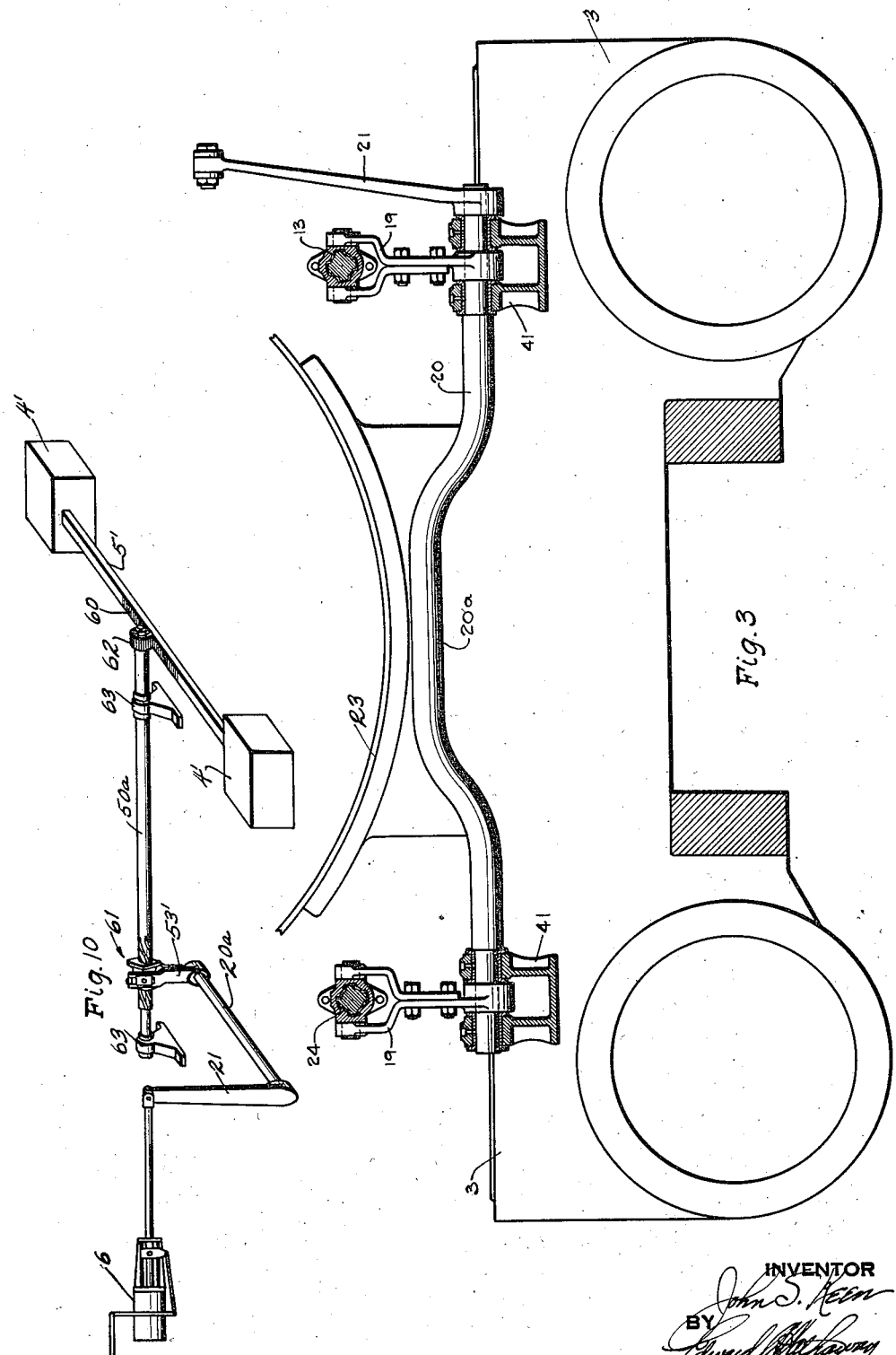

Oct. 29, 1935.   J. S. KEEN   2,018,790
REVERSING MECHANISM FOR POPPET VALVE GEAR CAM BOXES
Filed Nov. 19, 1932   4 Sheets-Sheet 3
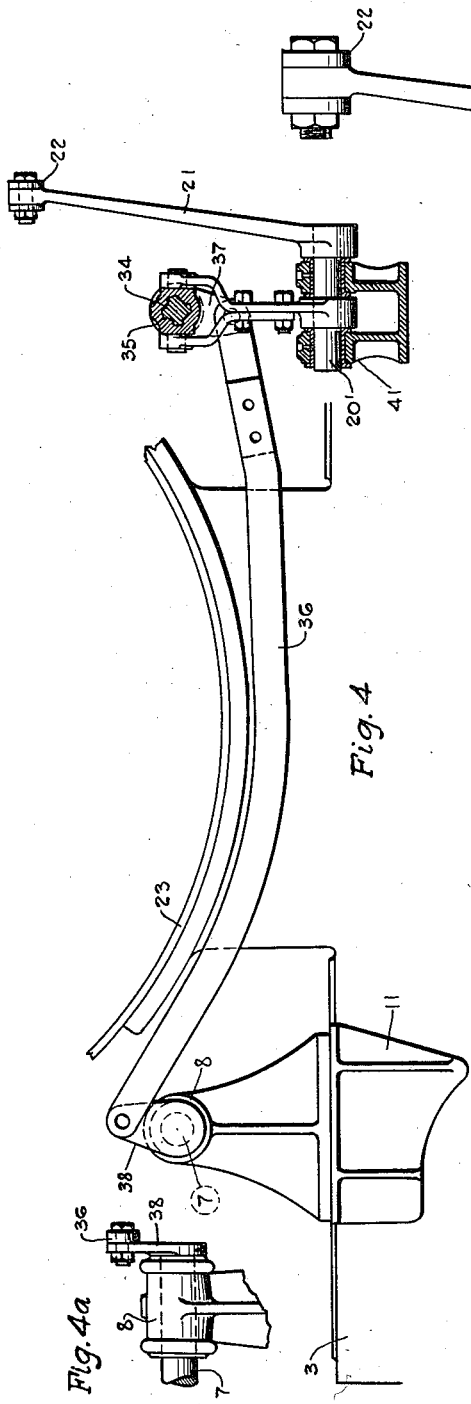
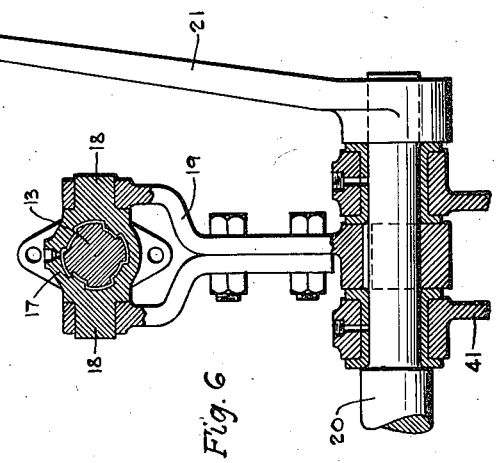
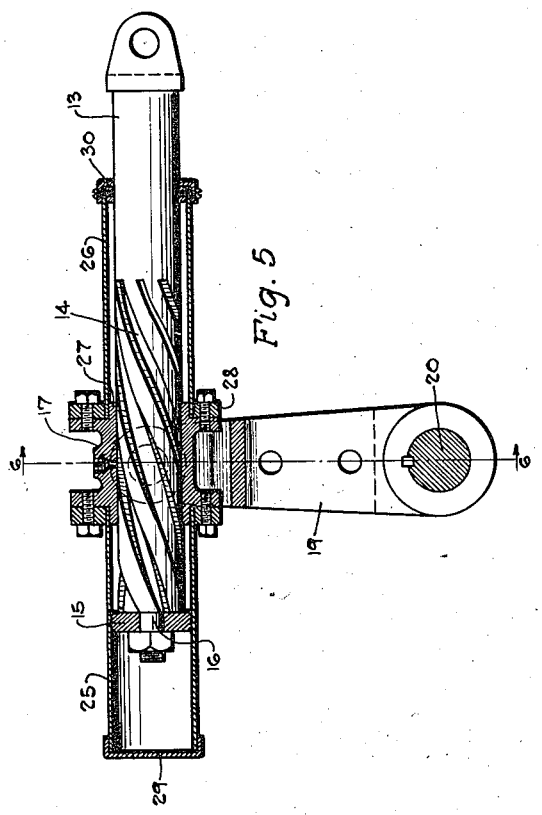

Oct. 29, 1935.   J. S. KEEN   2,018,790
REVERSING MECHANISM FOR POPPET VALVE GEAR CAM BOXES
Filed Nov. 19, 1932   4 Sheets-Sheet 4
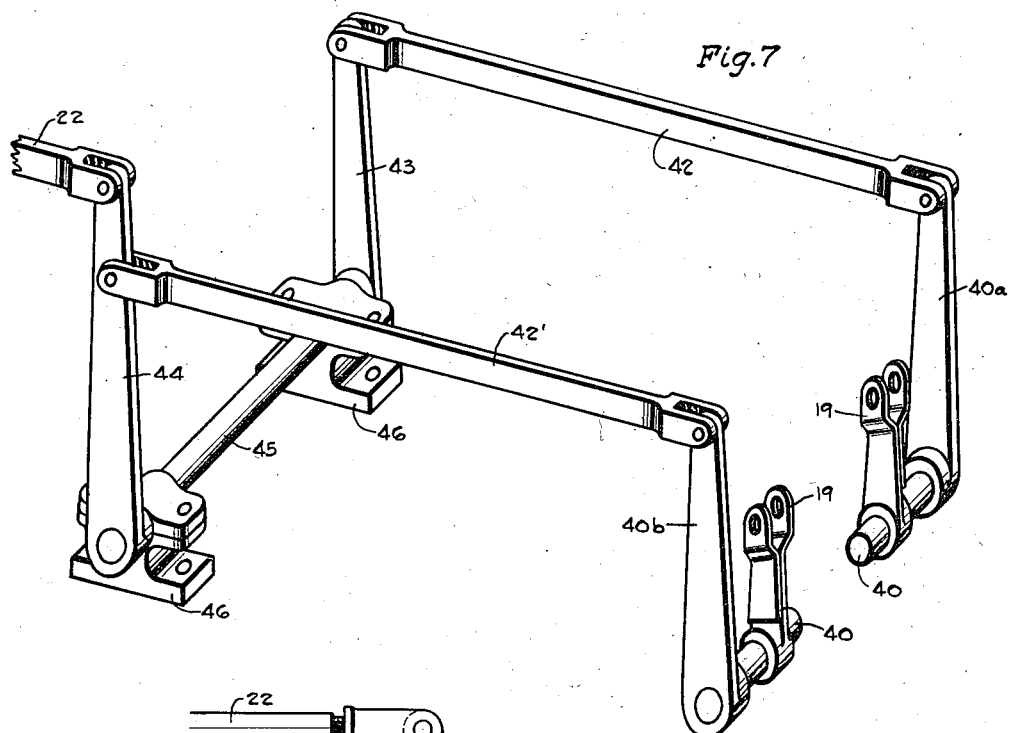
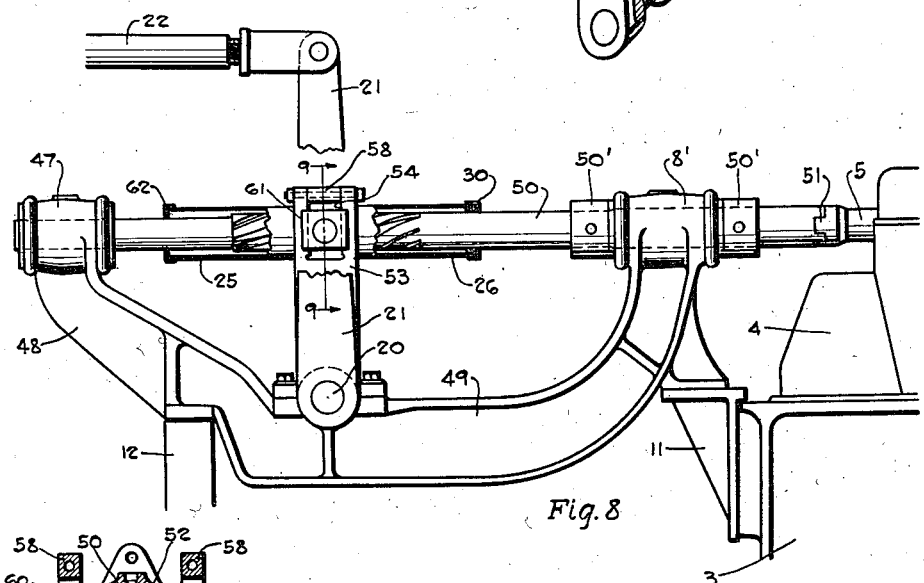
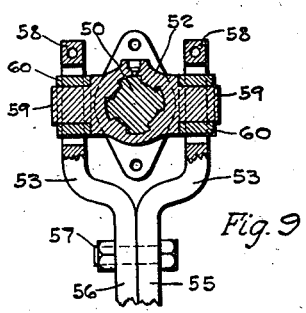

UNITED STATES PATENT OFFICE 2,018,790

REVERSING MECHANISM FOR POPPET VALVE GEAR CAM BOXES

John S. Keen, Philadelphia, Pa.

Application November 19, 1932, Serial No. 643,418

17 Claims. (Cl. 121—127)

This invention relates generally to valve gear actuating mechanisms for locomotives and more particularly to an improved combination of elements for connecting the reverse lever or power reverse motor with a cam box shaft of a poppet valve mechanism so as to effect efficient, simple and safe reversing or adjusting of the valve events, this shaft being preferably the cam box reverse shaft which as specifically shown herein for purposes of illustration is partially rotated to various fixed angular positions to effect the desired results.

Many attempts have heretofore been made to insure proper operation, control and adjustment of locomotive valve gears but notwithstanding the highly developed state of the art, deficiencies still exist. One phase of improvement in the art relates to poppet type locomotive valves operated by rotatable cams disposed in a cam box which is provided with a cam box shaft and actuating means therefor for effecting adjustment of the cut-off or reversing operations. The form of gear for which my invention is particularly adapted is the so-called Caprotti gear having poppet valves and a suitable cam box shaft or equivalent.

Heretofore the cam box shaft of the Caprotti gear has been actuated by the reversing lever operating through a linkage mechanism which was intended to insure a proper degree of angular adjustment of the cam box shaft for a given movement of the reversing lever.

It is one object of my invention to obtain not only a more uniform and perfect angular adjustment of the cam box shaft, especially of the Caprotti gear, but to have this improved combination function in such a manner that abnormal stresses and slack motion are eliminated or reduced to a minimum thus insuring complete control of the valve gear at all times, insuring freedom from impairment of the mechanical elements and insuring utmost safety and more perfect coordination of the chain of elements for adjusting the poppet valves.

Another and more specific object of my invention is to provide improved means for operating the cam box shaft and to do this in such a manner that said means may be enclosed and preferably encased in an oil-tight casing to permit the normally exposed elements to be continuously bathed in oil. The grit and dirt to which the external parts of a locomotive are subjected during normal operation, not only renders the equipment difficult to operate due to the inability to maintain proper lubrication but also causes such parts to wear unnecessarily and thus shorten the life of the apparatus and increase the cost of maintenance.

A further specific object of my invention is to provide improved means which may be incorporated in any existing installation of Caprotti gear and yet have it cooperate with the gear in such a manner as to obtain all the desired advantages and results of a complete new system.

Other objects and advantages will be more apparent to those skilled in the art from the following description of the accompanying drawings in which:

Fig. 3 is a transverse section taken substantially on the line 3—3 of Fig. 1 with parts of the locomotive omitted for clearness;

Fig. 4 is a modified arrangement for actuating the valve mechanism on the left side of the locomotive, this view being taken on a section corresponding to the line 3—3 of Fig. 1;

Fig. 4—a is a side elevation of Fig. 4 showing the link 38 and its bearing;

Fig. 5 is an enlarged longitudinal sectional view of one element of my improved invention which is aplicable in principle to all forms of the invention shown herein;

Fig. 6 is a vertical transverse section taken on the line 6—6 of Fig. 5;

Fig. 7 is a further modification showing a linkage mechanism in perspective for cooperation with the cam box shaft operating element such as shown in Figs. 5 and 6;

Fig. 8 is a further modification of the operating element of my improved combination, showing elimination of the universal joint; and Fig. 9 is a fragmentary transverse section taken on the line 9—9 of Fig. 8;

Fig. 10 is a perspective of a modification.

Figure 1:
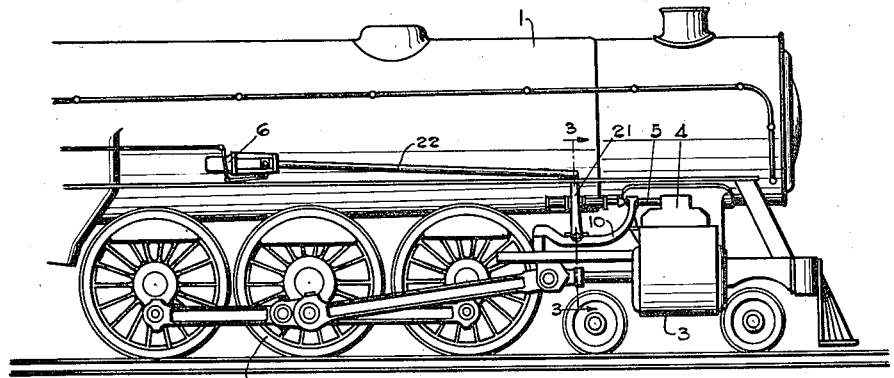
Fig. 1 is a side elevation of the front end of a locomotive embodying my invention.

In the illustrated embodiment of my invention I have shown in Fig. 1, a locomotive 1 having usual driving wheels 2 actuated from engine cylinders 3 which in this particular case is controlled preferably by the Caprotti type of gear diagrammatically shown in the form of a gear box 4 having a rotatable cam box shaft 5. The Caprotti type gear is sufficiently well-known as disclosed in Caprotti Patent 1,549,712 that its details need not be described so that it will suffice to state that the poppet valves thereof are adjusted for cut-off or reversing by rotation of the cam box reverse shaft 5 or equivalent shaft which hereinafter is referred to broadly as a cam box shaft. Heretofore this shaft has been connected to the usual vertical reversing lever through a very complicated linkage mechanism to insure proper angular movement of the shaft upon adjustment of the hand reverse lever or power reverse motor 6. To improve the smoothness of operation during adjustment and maintain a fixed adjustment and more uniform and safe control over the poppet valves, I have provided a shaft 7 supported in a suitable bearing 8 and carrying a universal joint 9 at its outer end. A thrust collar 8a is formed integrally with shaft 7 while a removable collar 8b is secured thereto by a tapered pin or other suitable means, these collars being disposed on each side of bearing 8 to prevent endwise movement of shaft 7. The bearing 8 is supported on an arm projecting upwardly from preferably a cast frame 10 which is supported on a front platform 11 and a rear support 12 thus providing a unitary frame for supporting the various elements involved in my improved combination. Connected to the universal joint 9 is a shaft 13 having a series of helical threads 14 of relatively large pitch, the outer end of this shaft carrying a bearing collar 15, Figs. 2 and 5, mounted upon a reduced end 16 and secured thereto by a nut.

Shafts 13 and 7 are adapted to be rotated by a longitudinally movable but non-rotatable nut 17 which as shown in Fig. 6 is provided with trunnion connections 18 in a vertical arm 19 made preferably of two separable pieces held together by bolts. The arm 19 in turn is keyed to a shaft 20 which carries a relatively long vertical reversing lever 21. This lever is connected by a rod 22 to either a power reverse motor 6 or to the hand lever in the engine cab.

It will be understood that inasmuch as the engine cylinders are disposed on each side of the locomotive with consequent duplication of the valve gear and adjusting mechanism, that the construction so far described is the same for each side of the locomotive except lever 21 is used on only one side thereof. To provide the proper interconnection between the mechanisms on the two sides, the shaft 20, Figs. 3 and 6, extends transversely of the locomotive beneath the boiler 23. The shaft is provided with a suitable bent portion 20a to permit its passage over certain mechanism beneath the boiler. To secure the proper direction of rotation for the respective valve mechanisms on each side thereof, the spiral thread and nut for the left side of the locomotive, as generally indicated at 24, Fig. 3, will have right hand threads while the spiral shaft 13 for the right side of the locomotive will have left hand threads, although it will of course be understood that any combination of threads or pitches may be employed depending upon the particular circumstances of an installation.

Figure 2:
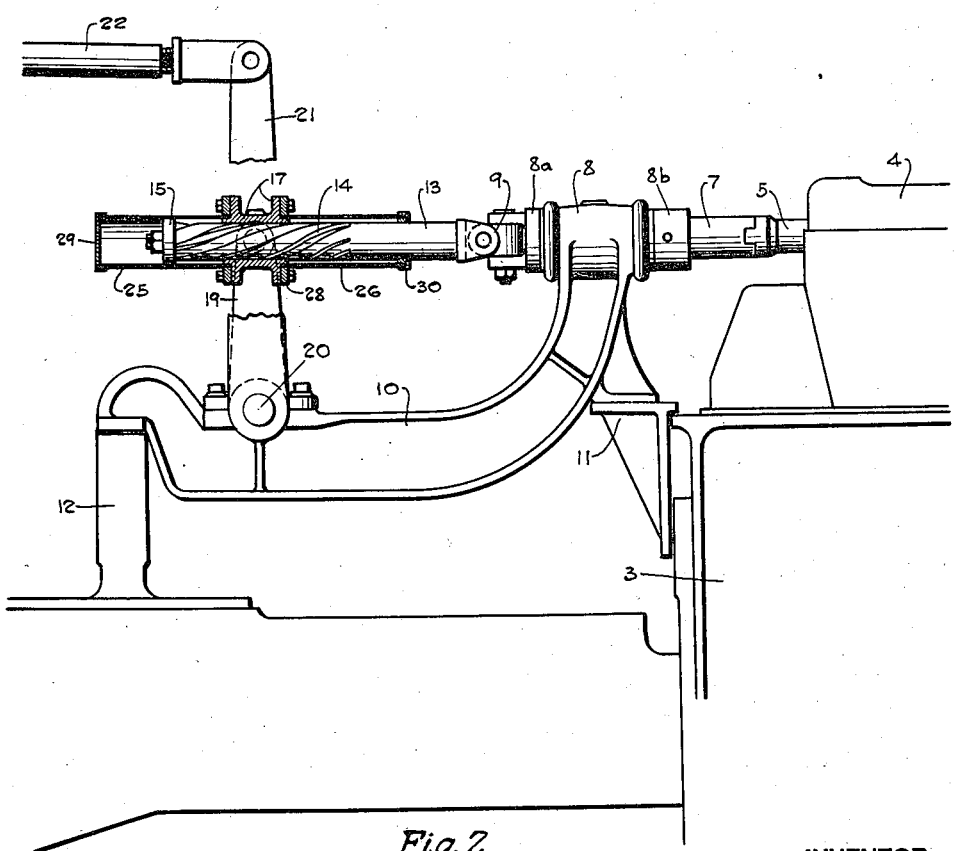
Fig. 2 is an enlarged fragmentary portion of the cam box and reversing mechanism for the cam box shaft embodying my improved invention, parts of which are shown in section to disclose details of construction.

As shown in Fig. 2, and particularly in Fig. 5, the spiral thread and nut are entirely encased and protected against the abrasive action of dirt or other foreign material. This is accomplished by providing tubular members 25 and 26 whose inner ends fit upon cylindrical extensions 27 and are tightly held to nut 17 by screw held flanges 28, the flanges and tubular members being preferably integrally connected as by welding or other suitable means. The outer end of tubular member 25 is entirely covered by a cap 29 while the outer end of tubular member 26 is covered by a simple packing gland 30 surrounding the spiral shaft 13. It is thus seen that lubricant may be enclosed for the spiral shaft thus insuring easy operation and minimum wear and maintenance of the movable parts with complete freedom from grit or other foreign matter.

*Operation.*—If the engineer desires to adjust the poppet valves he will cause longitudinal movement of link 22 either by manual operation or through the power reverse motor 6, thus causing forward or reverse oscillation of lever 21 about the axis of shaft 20 with consequent longitudinal but non-rotatable movement of nut 17 along the helical thread 14 thus causing rotation of the helical threaded shafts 7 and 5 to effect the desired adjustment of the cam box shaft 5 and the cams which actuate the poppet valves within the cam box 4. The universal joint 9 will allow for any angular displacement of shaft 13 caused by oscillating movement of lever 19 about the axis of shaft 20. This arrangement thus permits complete freedom of actuation of the parts without binding or unnecessary excessive stresses and it will be noted that during such compensating action the collar 15 by preferably having a sliding fit within the tubular member 25 will assist in maintaining proper end support for tube 25 and also serve as a stop for nut 17 in its extreme position. It will be further noted that once an adjustment has been effected, the spiral threaded shaft 13 and cam box shaft 5 will be rigidly held against further rotation and this positive holding will be uniform for any position of adjustment. Also irrespective of the extent of adjustment or movement of the operating mechanism, any further adjustment will be accomplished by an extremely uniform degree of rotation of the cam box shaft. It is this uniformity of adjustment and action of the elements which is so desirable, resulting in an effective reaction to the periodic and intermittent forces of the cams during opening of the valves, and in taking care of other forces from the cam box shaft. For example, the reaction to any angular forces transmitted from the cam box shaft during its operation is, in my improved arrangement, converted into both axial and rotational components by the spiral reversing gear. The rotational component is resisted by the large surface contact of the spiral threads which then creates the axial component that is resisted preferably by the surface contact between collars such as 8a or 8b and the stationary bracket 8. It is by such an arrangement of complete surface engagement in both rotational and axial directions, which is brought into play automatically upon any cam actuated or adjusting forces being transmitted from or to the cam box shaft, that I am able to effectively resist and control the cam box shaft forces without undue wear and tear of the parts, while at the same time being able to obtain a uniform angular control of the cam box shaft in response to uniform movement of the nut or the reversing arm.

In the modification shown in Fig. 4 only a single helically threaded shaft 34 and nut 35 is employed for controlling the valves on each side of the locomotive, the specific details of the nut, etc. being identical to the form first described, except that shaft 20 does not extend across the locomotive but terminates as a short shaft 20'. To actuate the cam box shaft on the other side of the locomotive, a link 36 is pivotally connected to a short arm 37 projecting downwardly from the forward end of either the helical threaded shaft 13 or shaft 7 while the other end of link 36 is pivotally connected to an arm 38 secured to and projecting upwardly from the rear end of a shaft, disposed at the other side of the locomotive, and corresponding to shaft 7.

In the modification shown in Fig. 7, nut actuating arms such as shown in Fig. 6 at 19, are disposed on each side of the locomotive and respectively secured to short shafts 40 journalled in the same type of bearings such as 41, Fig. 4. The shafts 40 sometimes cannot be made as a single shaft due to the presence of a mud drum, brake cylinder or various other elements which may be so disposed beneath the boiler as to prohibit a single shaft. To simultaneously actuate the two separate shafts 40, there is provided arms 40a and 40b connected to links 42 and 42' in turn connected to arms 43 and 44 which are secured to a common shaft 45 journalled in suitable bearings 46. Arm 44 is longer than arm 43 to permit pivotal connection to rod 22 leading from either the power reverse motor 6 or hand reverse lever in cab. From this disclosure it is seen that shaft 45 may be located wherever convenient such as between any two of the driving wheels. The remaining mechanism and operation thereof are the same as described in the preferred form.

The modification of Fig. 8 provides a very rigid arrangement in addition to elimination of a universal joint such as 9. This arrangement includes not only the forward bearing 8' as used in the preferred form but also a rear bearing 47 formed on an arm 48 preferably integrally with the common bearing bracket 49 similar to bracket 10 of Fig. 2. A helical threaded shaft 50 has its front and rear portions journalled in said bearings 8' and 47 and continued forwardly to take the place of universal shaft 7 of Fig. 2, but like this shaft, it has a suitable tongue and groove connection 51 with the cam box shaft 5. To prevent endwise movement of shaft 50, there is secured thereto by pins or other means, a pair of removable collars 50' on the side of bearing 8'. In this arrangement the helical nut as shown in Fig. 9 at 52, can move only longitudinally along the fixed axis of shaft 50 so that to compensate for the vertical component of movement of the oscillating vertical reversing lever 53, pedestal ways 54 are provided in the upper ends of arms 53. These arms are made of separable members 55 and 56 held together by bolts 57 so as not only to facilitate assembling of the parts but also effect an economical construction. The upper bifurcated ends of arms 53 may be secured together by bolts passing through spacing members 58 while trunnions 59 projecting from the helical nuts are journalled in blocks 60 slidable in pedestal ways 54. As is seen in Fig. 8 these blocks are provided with vertically extending end grooves to receive the pedestal ways thereby preventing lateral displacement of the blocks or rotation of the nut. In this modification the helical threaded nuts are encased by the same combination of elements as shown in Fig. 5 including a front tubular member 26 with a packing gland 30 although the rear tubular member 25 is provided with a rear packing gland 62.

*Operation of Fig. 8.*—Actuation of the vertical reversing lever 21 will cause the transverse shaft 20 to actuate arms 53 on each side of the locomotive to move mechanisms on each side of the locomotive identical to the above. Hence the operation of one is the same for both sides. Helical nut 52 and its associated casing 25 and 26 is moved axially of the helical threaded shaft 50 to cause partial rotation thereof and consequent adjustment of the cut-off or reversing position of the poppet valve cams. During movement of helical nut 52 guide block 60 will slide within the pedestal ways 54 while the nut is prevented from having any actual rotation due to the guide flanges 61 of block 60 engaging the lateral faces of the pedestal ways. Thus, this arrangement has the advantages of the other forms of the invention with the additional advantages that the universal joint is eliminated and a rigid support is provided for the actuating shaft 50.

From the foregoing description and disclosure, it is seen that I have provided an extremely simple and yet positive means for allowing the power reverse motor or manually operated cab lever to effect adjustment of the poppet type of valves, especially of the Caprotti valve mechanism, and to effect a uniform degree of rotation of the cam box shaft for any given degree of movement of the power reverse motor and at the same time reducing to a minimum or eliminating the usual abnormal stresses which have caused physical destruction of the usual type of actuating means employed with valve mechanism of the type which forms a part of my improved invention.

In the modification of Fig. 10 the cam boxes 4' are of such a type that the valve events may be reversed or adjusted by a reciprocable rod 5' provided with a rack 60. The cam boxes 4' are disposed on opposite sides of the locomotive while the reciprocable rod 5' extends transversely of the locomotive for common adjustment of the valve events. Of course it is assumed that the locomotive is of such a type to permit direct connection between the cam boxes as by the rod 5'. To adjust rod 5' which broadly constitutes a cam box shaft there is provided a partially rotatable actuating shaft 50a corresponding broadly to shaft 50 of the Fig. 8 form. This shaft has spiral threads, nut and arm of the same general type as shown in Fig. 8, but in Fig. 10 these elements are generally indicated at 61. The arms 53' is secured to a shaft 20a journalled in any suitable stationary bearings while the vertical reversing lever 21 is also secured to shaft 20a and adapted for connection to the reversing motor 6.

*Operation of Fig. 10.*—Reciprocation of the power reverse motor 6 or other usual reversing rods or the like would cause oscillation of shaft 20a with consequent rotation of shaft 50a through the spiral threads and nut thereon, thereby partially rotating a pinion 62 which meshes with rack 60 to thus shift shaft 5' to various transverse positions thereby effecting any desired reversing or adjustment of the valve events. The shaft 50a is supported in any suitable bearings diagrammatically indicated at 63 and it will of course be understood that the spiral threads and nut are preferably encased as shown in the other modifications.

It will of course be understood that various changes may be made in the details of construction and arrangement of parts by those skilled in the art without departing from the spirit of the invention as set forth in the appended claims.

I claim:

1. A reversing mechanism comprising, in combination, a cam box of the adjustable poppet valve gear type having a rotatable cam box shaft for effecting adjustment of the poppet valves, a reciprocable reversing rod, and means interposed between said rod and cam box shaft for effecting rotatable adjustment thereof in accordance with a predetermined movement of said rod, said interposed connection including a helically threaded shaft and nut elements adapted to have relative axial movement therebetween, one of said elements being operatively connected to said cam box shaft for rotation therewith and the other of said elements being operatively connected to said rod.

2. The combination set forth in claim 1 further characterized in that said cam box shaft has provision for being connected to said helical element thereby to cause said shaft and element to have the same angular rotation.

3. The combination set forth in claim 1 further characterized in that the nut is moved axially and that said cam box shaft and helical shaft have provision for being connected to each other so as to be simultaneously and similarly rotated during axial movement of said nut by said rod.

4. The combination set forth in claim 1 further characterized in that said helically threaded shaft is connected to said cam box shaft with a universal joint therebetween.

5. A reversing mechanism comprising, in combination, a cam box of the adjustable poppet valve gear type having a rotatable cam box shaft for effecting adjustment of the poppet valves, a helically threaded shaft operatively connected to said cam box shaft, a nut cooperating with said helical threads, means for effecting axial movement of said nut along said threaded shaft to effect simultaneous rotation of said shafts, and means for preventing axial displacement of said shaft.

6. A reversing mechanism comprising, in combination, a cam box of the adjustable poppet valve gear type having a rotatable cam box shaft for effecting adjustment of the poppet valves, a helically threaded shaft operatively connected to said cam box shaft, a nut cooperating with the threaded portion of said shaft, means for axially moving said nut to effect rotation of said cam box shaft including a pivotally supported arm connected to said nut, and means for actuating said arm.

7. A reversing mechanism for locomotive poppet valve gear cam boxes comprising, in combination, a cam box of the adjustable poppet valve gear type having a rotatable cam box shaft for effecting adjustment of the poppet valves, a helically threaded shaft operatively connected to said cam box shaft, a nut cooperating with said helical threads, an arm pivotally supported for arcuate movement about a fixed axis for effecting axial movement of said nut along said threads, and means whereby arcuate movement of said arm may be compensated for to allow a normal operating relation to be maintained at all times between said cam box shaft, threaded shaft, nut and arm.

8. The combination set forth in claim 7 further characterized in that said compensating means includes a universal joint between said threaded shaft and said cam box shaft.

9. A reversing mechanism for poppet valve gear cam boxes comprising, in combination, a rotatable cam box shaft, a fixed bearing, a shaft disposed therein and operatively connected to said cam box shaft, a helically threaded shaft operatively connected at one end to said bearing shaft while the other end of said threaded shaft is free, a nut cooperating with said threads, and means for effecting axial movement of said nut along said threads to effect simultaneous rotation of all of said shafts.

10. The combination set forth in claim 9 further characterized in that said nut actuating means includes an arm pivotally supported in a fixed bearing, and that said fixed bearings are supported on a common bearing frame.

11. A reversing mechanism for Caprotti valve gears comprising, in combination, a cam box shaft, a helically threaded shaft operatively connected to said cam box shaft, a nut cooperating with said threads, means for effecting axial movement of said nut to thereby cause rotation of said shafts, a bearing for supporting said threaded shaft and a bearing for supporting said nut actuating means, and a common supporting frame for said bearings.

12. A reversing mechanism for valve gear cam boxes comprising, in combination, a cam box of the adjustable poppet valve gear type having a rotatable cam box shaft for effecting adjustment of the poppet valves, means for effecting actuation thereof including a helically threaded shaft and cooperating nut, means for effecting relative movement therebetween so as to adjust said cam box shaft, and means for encasing the threaded portion of said shaft.

13. A locomotive gear operating mechanism comprising, in combination, a poppet valve gear cam box shaft to be actuated, and means for effecting actuation thereof including a helically threaded shaft and nut, said nut having a tubular portion projecting axially of the threaded shaft to enclose the same.

14. A locomotive gear operating mechanism comprising, in combination, a poppet valve gear cam box shaft to be actuated, means for effecting actuation thereof including a helically threaded shaft and nut, said nut having a tubular portion projecting axially of the threaded shaft to enclose the same, and means for closing the end of said tubular portion.

15. A locomotive gear operating mechanism comprising, in combination, a cam box of the adjustable poppet valve gear type having a rotatable cam box shaft for effecting adjustment of the poppet valves, and means for effecting actuation of said shaft including a helically threaded shaft and nut, said nut having a flange, and a tubular member extending axially of said threaded shaft to enclose the same, and provided with a flange portion adapted to be secured to said nut flange.

16. A locomotive valve gear mechanism comprising, in combination, a poppet valve gear cam box shaft, and means for effecting actuation thereof including a helically threaded shaft and nut, said nut carrying tubular portions projecting axially therefrom in opposite directions so as to protect the threads of said shaft and nut.

17. A locomotive valve gear mechanism comprising, in combination, a poppet valve gear cam box shaft, means for effecting actuation thereof including a helically threaded shaft and nut, said nut carrying tubular portions projecting axially therefrom in opposite directions so as to protect the threads of said shaft and nut, means for closing the end of one of said tubular members around said shaft, and means for entirely closing the outer end of the other of said tubular members thereby providing a casing for said nut and threads to protect the same and provide a lubricant chamber therefor.

JOHN S. KEEN.